(12) United States Patent
Rosenthal et al.

(10) Patent No.: US 11,123,647 B2
(45) Date of Patent: Sep. 21, 2021

(54) ENTERTAINMENT SYSTEM INCLUDING PERFORMATIVE FIGURINES

(71) Applicant: Disney Enterprises, Inc., Burbank, CA (US)

(72) Inventors: Janice Rosenthal, Burbank, CA (US); Nathan Nocon, Valencia, CA (US); Stephen A. Thornton, Redondo Beach, CA (US); Michael P. Goslin, Sherman Oaks, CA (US); Timothy Panec, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 68 days.

(21) Appl. No.: 16/266,966

(22) Filed: Feb. 4, 2019

(65) Prior Publication Data

US 2020/0246714 A1    Aug. 6, 2020

(51) Int. Cl.
| | |
|---|---|
| *A63H 30/04* | (2006.01) |
| *B25J 11/00* | (2006.01) |
| *A63H 5/00* | (2006.01) |
| *A63H 3/00* | (2006.01) |
| *B25J 13/00* | (2006.01) |

(52) U.S. Cl.
CPC ............. *A63H 30/04* (2013.01); *A63H 3/006* (2013.01); *A63H 5/00* (2013.01); *B25J 11/003* (2013.01); *B25J 13/006* (2013.01); *A63H 2200/00* (2013.01)

(58) Field of Classification Search
CPC .... A63H 2200/00; A63H 30/04; A63H 3/006; A63H 5/00; B25J 11/003; B25J 13/006

USPC .......................................... 446/297, 298, 404
See application file for complete search history.

(56) References Cited

U.S. PATENT DOCUMENTS

| | | | | |
|---|---|---|---|---|
| 4,844,475 | A | * | 7/1989 | Saffer ..................... A63F 13/04 463/5 |
| 5,752,880 | A | * | 5/1998 | Gabai .................... A63H 30/04 434/308 |
| 6,110,000 | A | * | 8/2000 | Ting ......................... A63H 3/28 446/175 |
| 7,568,963 | B1 | * | 8/2009 | Atsmon ................... A63H 3/28 446/175 |
| 8,444,452 | B2 | * | 5/2013 | Dang ..................... A63H 13/02 446/397 |

(Continued)

*Primary Examiner* — Joseph B Baldori
(74) *Attorney, Agent, or Firm* — Farjami & Farjami LLP (57) ABSTRACT

An entertainment system includes multiple figurines configured for wireless communication, and a control device having a hardware processor, a system memory storing a control application, and a transceiver. The hardware processor executes the control application to detect each of the figurines via the transceiver and to identify a predetermined entertainment for performance by two or more of the figurines. The hardware processor further executes the control application to transmit control signals to the two or more figurines via the transceiver, wherein a first control signal instructs a first of the two or more figurines to perform a first portion of the predetermined entertainment, and a second control signal instructs a second of the two or more figurines to perform a second portion of the predetermined entertainment. The two or more of the figurines are configured to perform the predetermined entertainment according to the control signals.

20 Claims, 7 Drawing Sheets

(56) References Cited

U.S. PATENT DOCUMENTS

| | | | | |
|---|---|---|---|---|
| 8,795,022 | B2* | 8/2014 | Lipman | A63H 3/28 446/175 |
| 8,821,209 | B2* | 9/2014 | Fong | A63F 13/54 446/175 |
| 9,833,725 | B2* | 12/2017 | Watry | A63H 33/26 |
| 2001/0034180 | A1* | 10/2001 | Fong | A63H 3/28 446/175 |
| 2004/0259465 | A1* | 12/2004 | Wright | A63H 3/28 446/297 |
| 2013/0288563 | A1 | 10/2013 | Zheng | |
| 2014/0358986 | A1* | 12/2014 | Min | A63H 30/04 709/202 |
| 2015/0243286 | A1* | 8/2015 | Goslin | A63H 5/00 704/500 |
| 2015/0336016 | A1* | 11/2015 | Chaturvedi | A63H 3/36 446/484 |
| 2016/0287979 | A1* | 10/2016 | Akavia | A63F 3/04 |
| 2017/0225069 | A1* | 8/2017 | Goslin | A63F 13/428 |
| 2018/0111046 | A1* | 4/2018 | Roberts | A63F 13/285 |
| 2018/0272240 | A1* | 9/2018 | Soudek | A63H 3/28 |

\* cited by examiner

ENTERTAINMENT SYSTEM INCLUDING PERFORMATIVE FIGURINES

BACKGROUND

Lullabies and bedtime stories are time honored rituals for preparing children for bedtime and restful sleep. However, as social and technological trends result in ever younger children adopting and enjoying the use of modern electronic devices, depriving them of that use and enjoyment in favor of traditional modes of storytelling to and song at bedtime may be undesirably stressful. For example, requiring a child to turn off a cherished electronic toy with which the child is interacting at bedtime may make the child restless and less able to settle down for the night.

Unfortunately, the use of conventional electronics at bedtime can itself be overstimulating. In addition, the blue light emitted by many electronic device displays can undesirably interfere with healthy sleep patterns. Consequently, there is a need in the art for a modern alternative to traditional storytelling and song, capable of soothing a child into a state of restfulness without depriving the child of interaction with a favorite electronic toy or device.

SUMMARY

There are provided entertainment systems including performative figurines and methods for their use, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
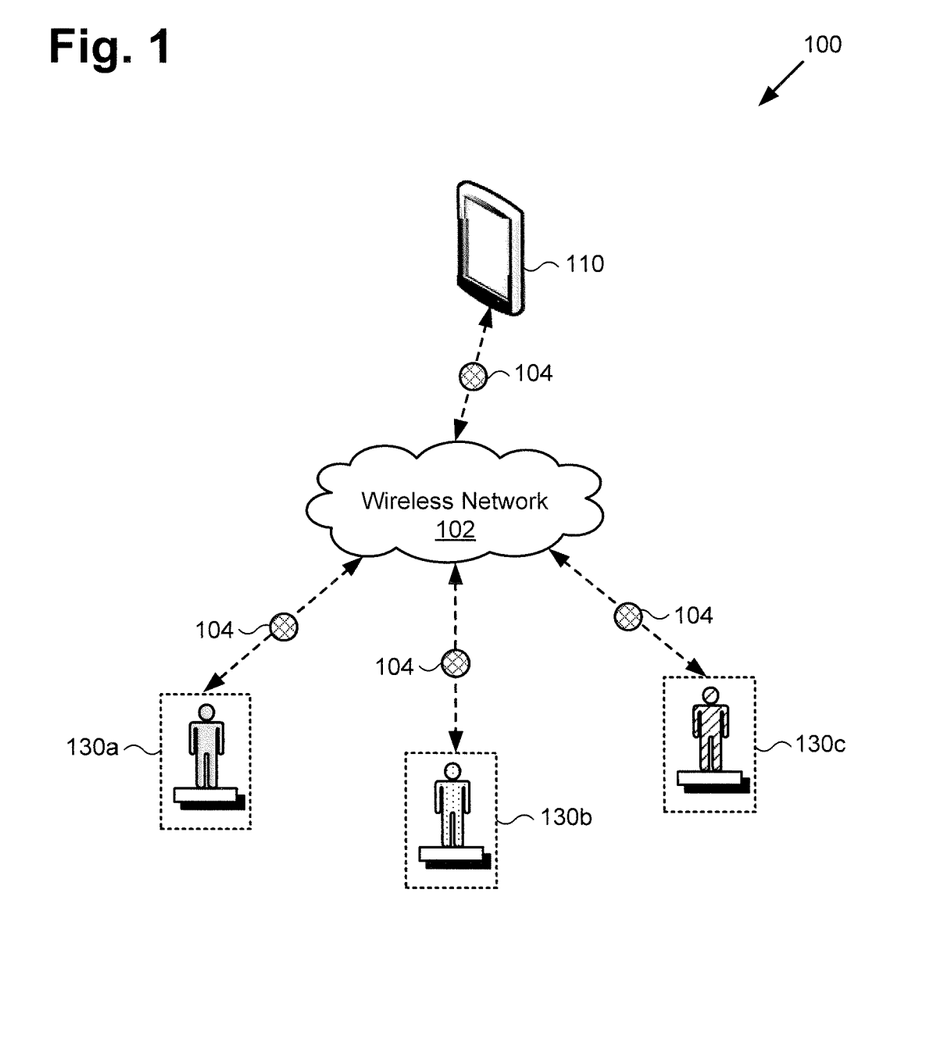
FIG. 1 shows a diagram of an exemplary entertainment system including performative figurines, according to one implementation.

FIG. 1 shows a diagram of exemplary entertainment system 100 including performative figurines 130a, 130b, and 130c, according to one implementation. As shown in FIG. 1, figurines 130a, 130b, and 130c are in wireless communication with control device 110 of entertainment system 100 via wireless network 102. As further shown in FIG. 1, each of figurines 130a, 130b, and 130c receives control signals 104 from control device 110 over wireless network 102.

As described in greater detail below, control device 110 is configured to detect each of figurines 130a, 130b, and 130c, and to identify a predetermined entertainment for performance by two or more of figurines 130a, 130b, and 130c. For example, according to the exemplary implementation shown in FIG. 1, control device 110 may identify a predetermined entertainment for performance by all three of figurines 130a, 130b, and 130c. In addition, control device 110 may transmit control signals 104 to figurines 130a, 130b, and 130c, wherein a first control signal of control signals 104 instructs figurine 130a to perform a first portion of the predetermined entertainment, a second control signal of control signals 104 instructs figurine 130b to perform a second portion of the predetermined entertainment, and a third control signal of control signals 104 instructs figurine 130c to perform a third portion of the predetermined entertainment.

Figurines 130a, 130b, and 130c may then perform the predetermined entertainment according to control signals 104 and using one or more of several output features, such as lights and/or speakers for example, with which figurines 130a, 130b, and 130c may be equipped. In one implementation, each of figurines 130a, 130b, and 130c may portray a different movie, television, or theme park character, for example. It is noted that although FIG. 1 depicts entertainment system 100 as including three figurines 130a, 130b, and 130c, in other implementations, entertainment system 100 may include as few as one or two figurines, or more, or many more than three figurines.

In implementations in which each of figurines 130a, 130b, and 130c are equipped with multiple lights, the predetermined entertainment performed by figurines 130a, 130b, and 130c may include a light show. In some implementations, such a light show may be synchronized to audio, such as music and/or song for example, output by control device 110. In other implementations, figurines 130a, 130b, and 130c may each be further equipped with one or more speaker(s). In those latter implementations, a light show performed by figurines 130a, 130b, and 130c may be synchronized to audio, such as music and/or song, output by the respective speakers of figurines 130a, 130b, and 130c.

It is noted that although control device 110 is shown as a personal communication device in the form of a smartphone or tablet computer in FIG. 1, that representation is provided merely as an example. More generally, control device 110 may be any suitable mobile or stationary computing device or system capable of performing data processing sufficient to provide a user interface, support connections to wireless network 102, and implement the functionality ascribed to control device 110 herein. For example, in other implementations, control device 110 may take the form of a smartwatch, a gaming console, or a laptop or desktop computer, for example.

Wireless network 102 may be implemented using any one of several wireless network protocols. In some implementations, it may be advantageous or desirable for control device 110 to be in wireless communication with figurines 130a, 130b, and 130c via a Bluetooth Low Energy (BLE) network. Thus, in those implementations, wireless network 102 may be implemented as a BLE network. Alternatively, in some implementations, wireless network 102 may take the form of a WiFi, Bluetooth, or ZigBee network, or may be implemented using 60 GHz wireless communications methods.

According to the exemplary implementation shown in FIG. 1, control device 110 is in wireless communication with each of figurines 130a, 130b, and 130c directly, via wireless network 102. In that implementation, control signals 104 are transmitted to figurines 130a, 130b, and 130c by control device 110 over wireless network connections provided by wireless network 102. However, in other implementations, control device 110 may be configured to transmit control signals 104 to figurines 130a, 130b, and 130c without having a dedicated wireless network connection to any of figurines 130a, 130b, and 130c. For example, in those implementations, control device 110 may transmit control signals 104 via advertising packets receivable by figurines 130a, 130b, and 130c.

Figure 2:
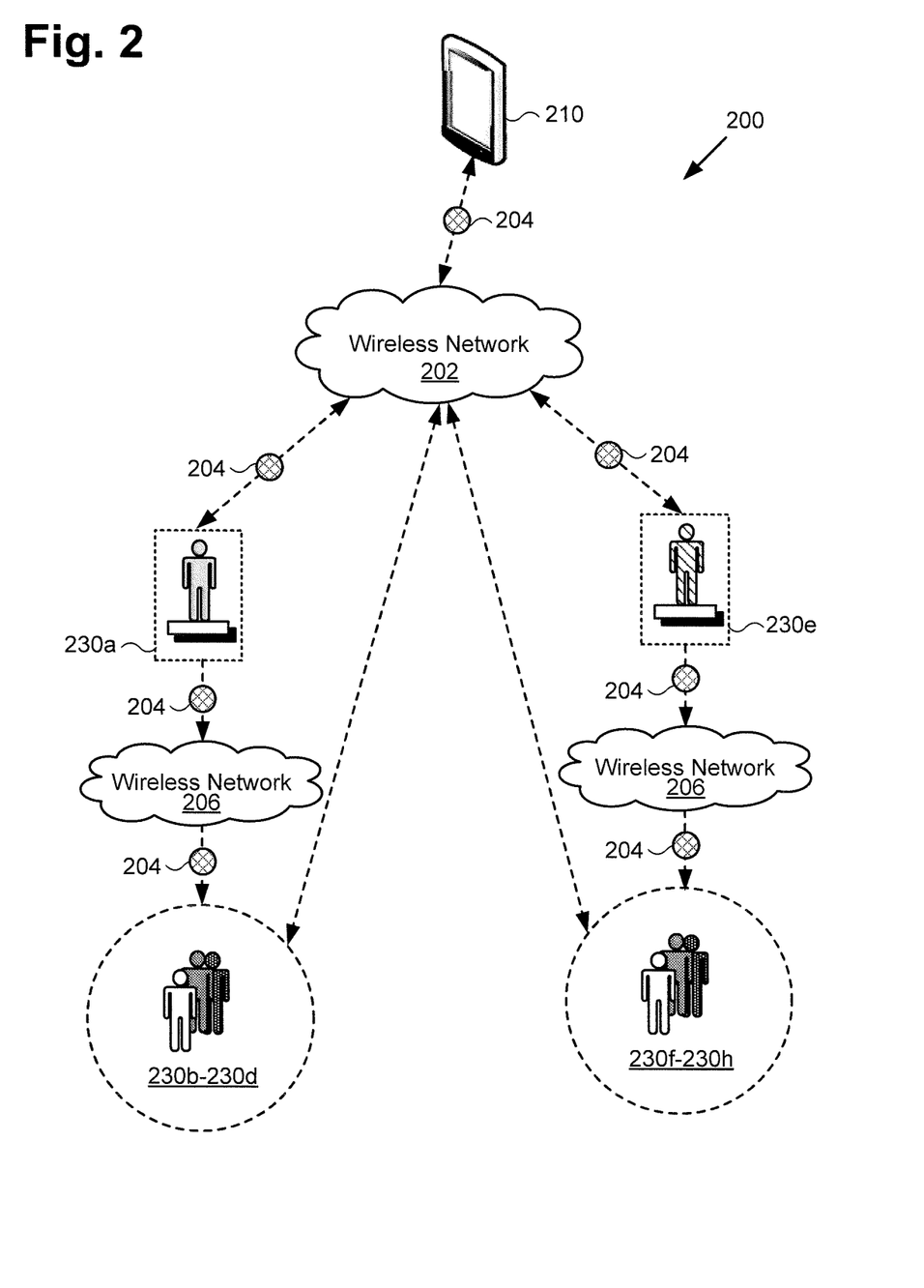
FIG. 2 shows a diagram of an exemplary entertainment system including performative figurines, according to another implementation.

FIG. 2 shows a diagram of exemplary entertainment system 200 including performative figurines 230a, 230b, 230c, 230d, 230e, 230f, 230g, and 230h (hereinafter "figurines 230a-230h") according to one implementation. As shown in FIG. 2, figurines 230a and 230e are in wireless communication with control device 210 of entertainment system 200 via wireless network 202. As further shown in FIG. 2, each of figurines 230a and 230e receives control signals 204 from control device 210 over wireless network 202. Also shown in FIG. 2 is wireless network 206 communicatively coupling figurine 230a with figurines 230b, 230c, and 230d (hereinafter "figurines 230b-230d") and communicatively coupling figurine 230e with figurines 230f, 230g, and 230h (hereinafter "figurines 230f-230h").

Control device 210 is configured to detect each of figurines 230a-230h, and to identify a predetermined entertainment for performance by two or more of figurines 230a-230h. For example, according to the exemplary implementation shown in FIG. 2, control device may identify a predetermined entertainment for performance by all or some of figurines 230a-230h. In addition, control device 210 may transmit control signals 204 to figurines 230a and 230e over wireless network 202.

According to the exemplary implementation shown in FIG. 2, control device 210 may utilize wireless network 202 to detect figurines 230b-230d and 230f-230h, but may not have a dedicated wireless network connection to figurines 230b-230d and 230f-230h. Instead, according to the present implementation, control device 210 is configured to transmit control signals 204 to figurines 230a and 230e via first wireless network 202, and figurines 230a and 230e are configured to retransmit control signals 204 to others of figurines 230a-230h via second wireless network 206 using a different wireless protocol than the wireless protocol used by wireless network 202.

Each of figurines 230a-230h corresponds in general to any of figurines 130a, 130b, and 130c, in FIG. 1. That is to say, figurines 230a-230h may share any of the characteristics attributed to corresponding figurines 130a, 130b, and 130c by the present disclosure, and vice versa. In addition, control device 210, wireless network 202, and control signals 204, in FIG. 2, correspond respectively in general to control device 110, wireless network 102, and control signals 104, in FIG. 1. Thus, control device 210, wireless network 202, and control signals 204 may share any of the characteristics attributed to corresponding control device 110, wireless network 102, and control signals 104 by the present disclosure, and vice versa.

Like figurines 130a, 130b, and 130c, figurines 230a-230h may perform the predetermined entertainment identified by control device 210 according to control signals 204 and using one or more of several output features, such as lights and/or speakers, with which figurines 230a-230h may be equipped. In one implementation, each of figurines 230a-230h may portray a different movie, television, or theme park character, for example.

According to some implementations, figurines 230a-230h may be configured to perform as groups of figurines. For example, figurines 230a and 230b-230d may depict characters from the same movie, television program, or theme park attraction and may perform a portion of a predetermined entertainment as a group. Similarly, figurines 230e and 230f-230g may depict characters from another movie, television program, or theme park attraction and may perform another portion of the predetermined entertainment as a group.

It is noted that although FIG. 2 depicts entertainment system 200 as including two figurines 230a and 230e in direct wireless communication with control device 210 via wireless network 202, in other implementations, more of figurines 230a-230h may be in wireless communication with control device 210 via wireless network 202. It is further noted that although FIG. 2 depicts each of figurines 230a and 230e retransmitting control signals to three other figurines, that representation is provided merely by way of example. In other implementations, entertainment system 200 may include more than the eight performative figurines shown as figurines 230a-230h. For example, in one implementation, entertainment system 200 may include approximately fifty performative figurines, or more.

Like wireless network 102/202, wireless network 206 may be implemented using any one of several wireless network protocols. For example, wireless network 206 may take the form of a WiFi, Bluetooth, BLE, or ZigBee network, or may be implemented using 60 GHz wireless communications methods.

According to the exemplary implementation shown in FIG. 2, control device 210 is in wireless communication with each of figurines 230a and 230e directly, via wireless network 202. In that implementation, control signals 204 are transmitted to figurines 230a and 230e by control device 210 over wireless network connections provided by wireless network 202. However, in other implementations, control device 210 may be configured to transmit control signals 204 to figurines 230a and 230e without having a dedicated wireless network connection to either of figurines 230a and 230e. For example, in those implementations, control device 210 may transmit control signals 204 via advertising packets receivable by figurines 230a and 230e. Moreover, in those implementations, control device 210 may also transmit control signals 204 to figurines 230b-230d and 230f-230h via advertising packets receivable by those figurines, thereby obviating any need for retransmission of control signals 204 via wireless network 206.

Figure 3A:
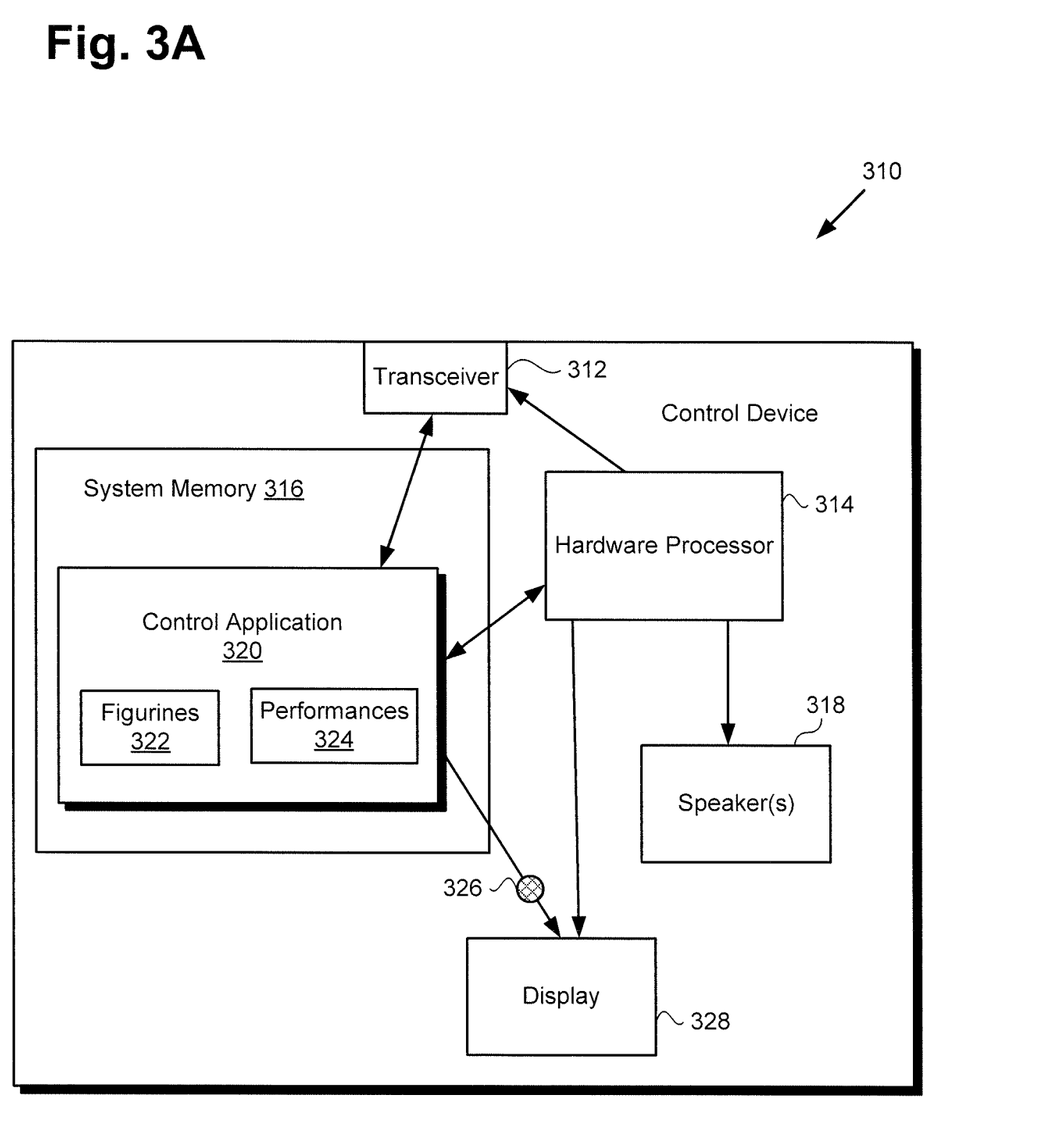
FIG. 3A shows a diagram of an exemplary control device suitable for use as part of the entertainment systems of FIGS. 1 and 2, according to one implementation.

FIG. 3A shows a diagram of exemplary control device 310 suitable for use as part of entertainment systems 100 and 200, in FIGS. 1 and 2, according to one implementation. As shown in FIG. 3A, exemplary control device 310 includes hardware processor 314, and system memory 316 implemented as a non-transitory storage device storing control application 320. In addition, control device 310 includes wireless transceiver 312, one or more speaker(s) 318, and display 328. Also shown in FIG. 3A are figurines database 322 and performances library 324 of control application 320, as well as user interface 326 output to display 328 by control application 320.

Control device 310 corresponds in general to control device 110/210, in FIGS. 1 and 2. In other words, control device 310 may share any of the features attributed to corresponding control device 110/210 by the present disclosure, and vice versa. Consequently, like control device 110/210, control device 310 may be implemented as a smartphone, smartwatch, tablet computer, gaming console, or laptop or desktop computer, for example. Moreover, although not shown in FIGS. 1 and 2, control device 110/210 may include features corresponding to hardware processor 314, system memory 316 storing control application 320, wireless transceiver 312, speaker(s) 318, and display 328.

Hardware processor 314 may be the central processing unit (CPU) for control device 110/210/310, for example, in which role hardware processor 314 runs the operating system for control device 110/210/310 and executes control application 320. System memory 316 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 314 of client device 110/210/310. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, RAM, programmable read-only memory (PROM), erasable PROM (EPROM), and FLASH memory.

Transceiver 312 may be implemented as a wireless communication unit enabling control device 110/210/310 to exchange data with figurines 130a, 130b, 130c and/or figurines 230a-230h (hereinafter "figurines 130a-130c/230a-230h"), in FIGS. 1 and 2, via wireless network 102/202. For example, transceiver 312 may be configured to support one or more of WiFi, Bluetooth, BLE, ZigBee, and 60 GHz wireless communications protocols. Moreover, in some implementations, transceiver 312 may also be configured for cellular communications via a 4G wireless network, and/or via a 5G wireless network satisfying the IMT-2020 requirements established by the International Telecommunication Union (ITU). It is noted that display 328 may be implemented as a liquid crystal display (LCD), a light-emitting diode (LED) display, an organic light-emitting diode (OLED) display, or any other suitable display screen that performs a physical transformation of signals to light.

Figure 3B:
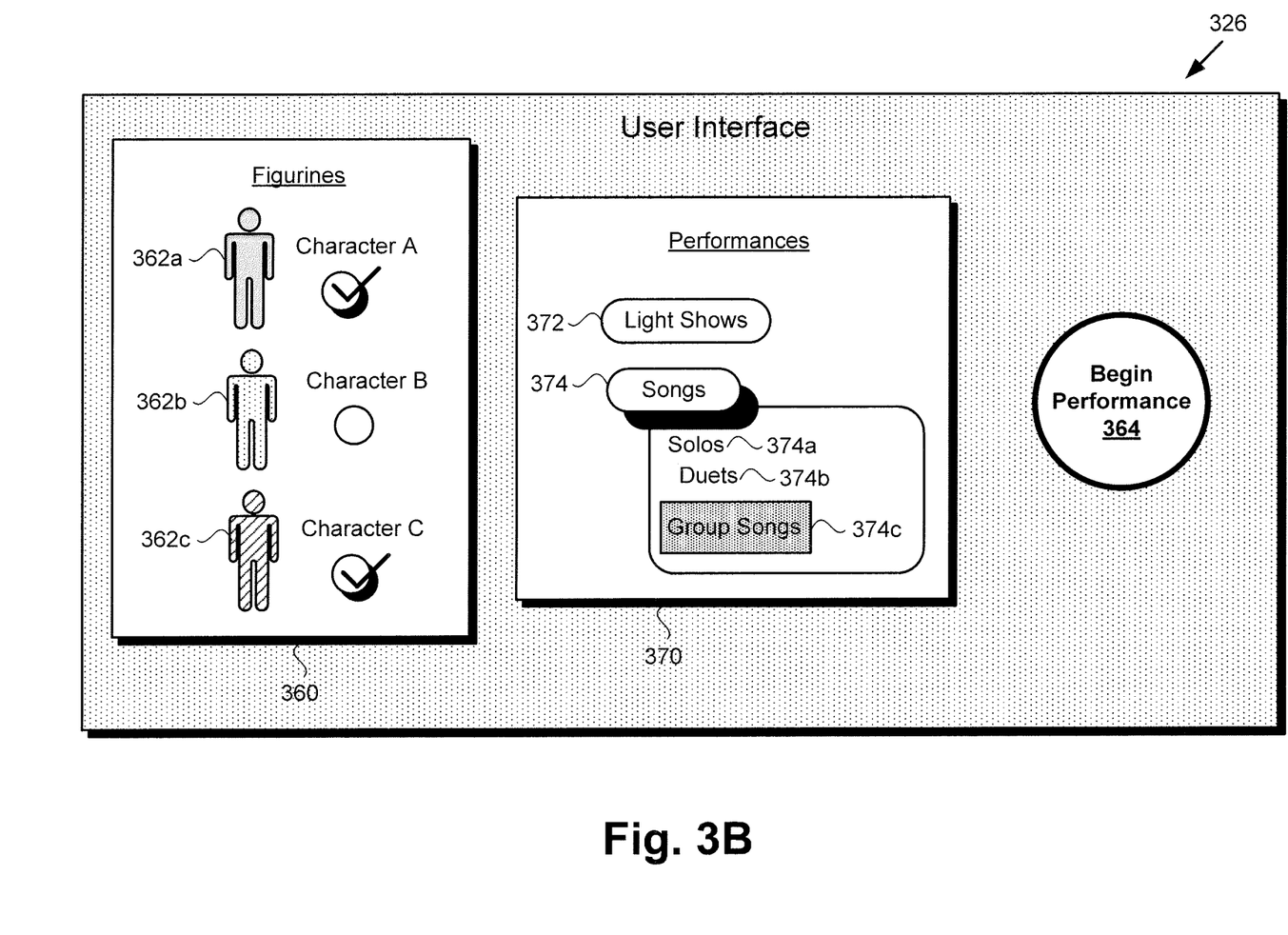
FIG. 3B shows an exemplary user interface provided by a control device of an entertainment system including performative figurines, according to one implementation.

FIG. 3B shows a more detailed representation of exemplary user interface 326 provided by control device 110/210/310, according to one implementation. As shown in FIG. 3B, exemplary user interface 326 includes figurines selection menu 360, performances selection menu 370, and begin performance button 364. It is noted that figurines selection menu 360 enables a user of control device 110/210/310 to select figurines from figurines database 322 in FIG. 3A, while performances selection menu 370 enables the user to select performances from performances library 324 in that figure.

According to the exemplary implementation shown in FIG. 3B, characters 362a, 362b, and 362c correspond respectively to figurines 130a/230a, 130b/230b, and 130c/230c in FIGS. 1 and 2. That is to say, characters 362a, 362b, and 362c may be movie, television, or theme park characters, for example, portrayed by respective figurines 130a/230a, 130b/230b, and 130c/230c.

As shown by FIG. 3B, characters 362a and 362c have been selected by the user of control device 110/210/310 to perform an entertainment. In addition to selection of characters 362a and 362c user interface 326 further enables selection of one or more predetermined entertainments for performance by characters 362a and 362b from performances selection menu 370. According to the implementation shown in FIG. 3B, such predetermined entertainments include light shows 372 and songs 374. Selection of songs 374 may open a submenu including the options solos 374a, duets 374b, and group songs for performance by three or more characters 374c, for example. Selection of light shows 372 may open a submenu offering analogous options.

As also shown in FIG. 3B, group songs 374c is grayed out or otherwise obscured to indicate that group songs 374c is not presently selectable as a performance due to selection of less three characters as performers. In one implementation, for example, the status of group songs 374c as selectable or not selectable may change in response to an action by the user of control device 110/210/310. As a specific example, selection of character 362b by the user, in addition to selection of characters 362a and 362b by the user, may cause group songs 374c to become a selectable performance.

It is noted that although light shows 372 and songs 374 are shown as alternative types of entertainment in FIG. 3B, that representation is provided merely in the interests of conceptual clarity. In various implementations, some or all of light shows 372 may be accompanied by music or song. Furthermore, songs 374 may be accompanied by predetermined lighting sequences.

As an example of such a combination of songs and the use of lighting, and referring to FIG. 2 in combination with FIG. 3, let figurine 230a portray a romantic hero character, figurine 230b portray a heroine character, figurine 230e portray a villain character, and figurines 230c, 230d, and 230f-230h portray various other characters. In one use case, a predetermined group songs 374 performance selectable via user interface 326 may begin with figurine 230a displaying lights in colors associated with its portrayed character while a song identified with the character is played. The performance may continue with activation of lights integrated with figurine 230b as the audio being played changes to a duet identified with the characters portrayed by figurines 230a and 230b.

The example group song performance may continue with figurines 230a and 230b going dark as figurine 230e lights up and audio identified with the villain portrayed by figurine 230e is played. After some interval, lights on figurines 230a and 230b may be activated while the villain audio output continues. Subsequently, various others of figurines 230b, 230c, and 230f-h may light up as the audio output is selectively changed. As a finale, all figurines may light up or flash as a collective song is played.

Figure 4A:
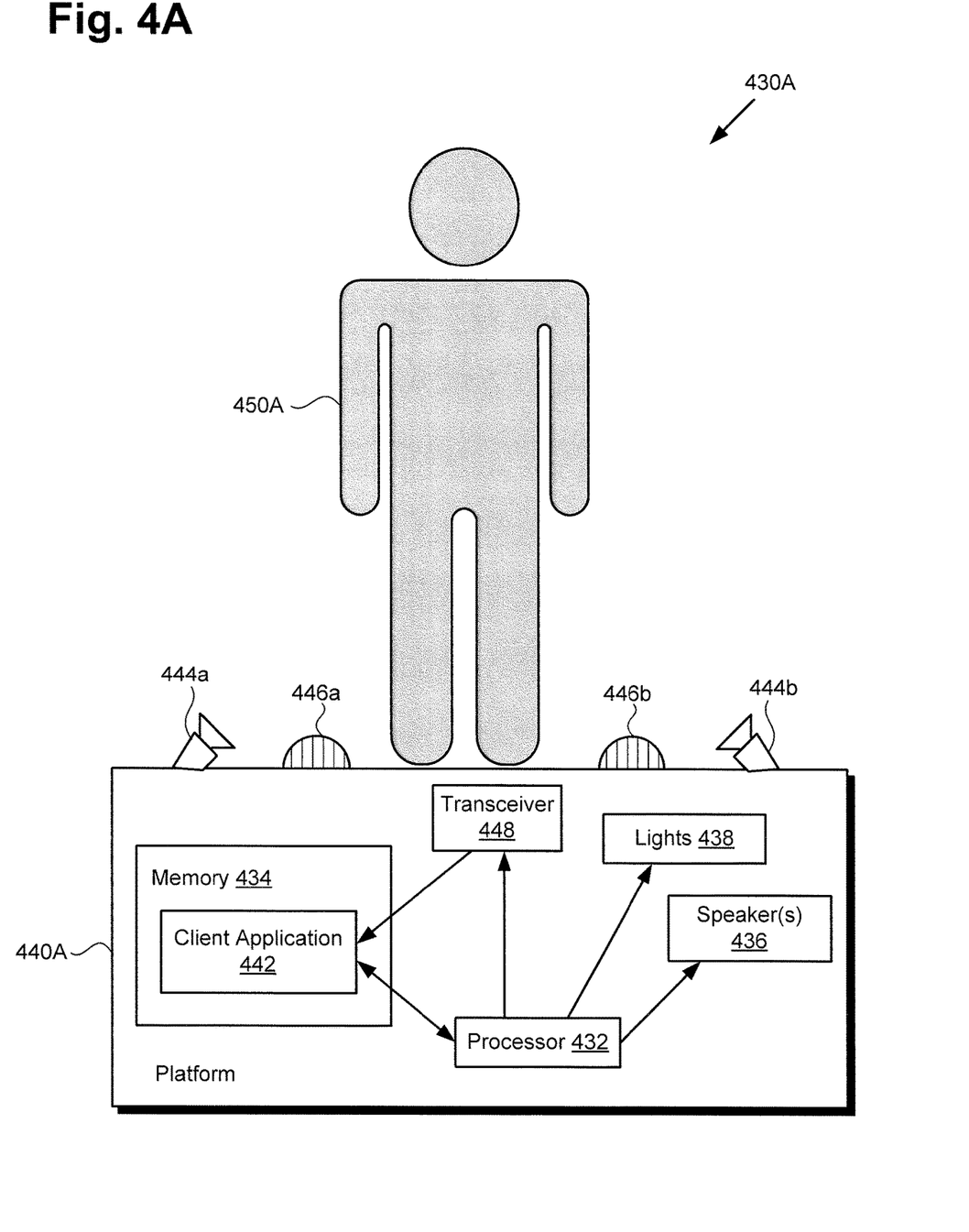
FIG. 4A shows a diagram of an exemplary figurine suitable for use as part of the entertainment systems of FIGS. 1 and 2, according to one implementation.

FIG. 4A shows a diagram of exemplary performative figurine 430A, according to one implementation. According to the exemplary implementation shown in FIG. 4A, figurine 430A includes body 450A mounted over, coupled to, or integrated with platform 440A. As shown in FIG. 4A, platform 440A includes hardware processor 432 and memory 434 implemented as a non-transitory storage device storing client application 442. In addition, platform 440A includes wireless transceiver 448, one or more speaker(s)

436, and lights 438. It is noted, that although platform 440A is shown as a rectangular box below the body 450A of figurine 430A, in other implementations platform 440A may take other shapes or ornamental forms and its components may be integrated in any suitable part of figurine 430A, such as within, behind, on top of, or adjacent to body 450A.

As further shown in FIG. 4A, lights 438 include one or more spotlight(s) 444a/444b for highlighting facial features of body 450A, and one or more colored light(s) 446a/446b providing back lighting and/or strobe lighting for figurine 430A. In some implementations, spotlight(s) 444a/444b may be implemented using white LEDs configured for directional lighting. Moreover, in some implementations, colored light(s) 446a/446b may be implemented using directional or non-directional colored LEDs, such as one or more of red, green, and blue LEDs.

Figurine 430A, in FIG. 4A corresponds in general to any or all of figurines 130a-130c/230a-230h in FIGS. 1 and 2. That is to say, figurines 130a-130c/230a-230h may share any of the characteristics attributed to figurine 430A by the present disclosure, and vice versa. Thus, although not shown in FIGS. 1 and 2, each of figurines 130a-130c/230a-230h may include features corresponding to body 450A and platform 440A having hardware processor 432, memory 434 storing client application 442, speaker(s) 436, lights 438, and wireless transceiver 448.

Hardware processor 432 may be a microprocessor of figurine 130a-130c/230a-230h/430A, for example, in which role hardware processor 432 runs the firmware for figurine 130a-130c/230a-230h/430A and executes client application 442. Transceiver 448 may be implemented as a wireless communication unit enabling figurine 130a-130c/230a-230h/430A to exchange data with control device 110/210/310 via wireless network 102/202. Furthermore, according to some implementations, wireless transceiver 448 may enable figurine 130a-130c/230a-230h/430A to communicate with others of figurines 130a-130c/230a-230h/430A via wireless network 206. Wireless transceiver 448 may be configured to support one or more of WiFi, Bluetooth, BLE, ZigBee, and 60 GHz wireless communications protocols.

Figure 4B:
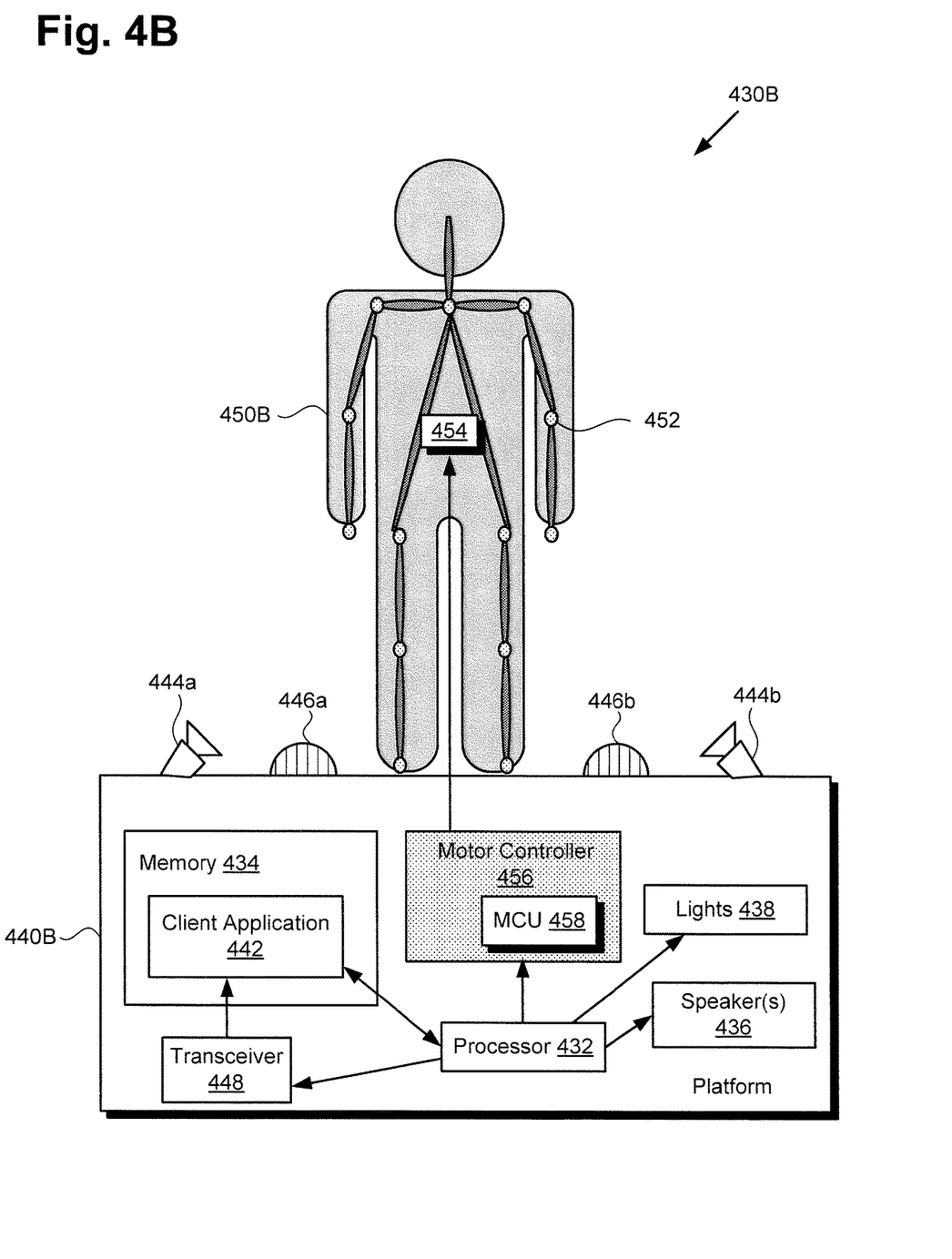
FIG. 4B shows a diagram of an exemplary figurine suitable for use as part of the entertainment systems of FIGS. 1 and 2, according to another implementation.

FIG. 4B shows a diagram of exemplary performative figurine 430B, according to another implementation. According to the exemplary implementation shown in FIG. 4B, figurine 430B includes body 450B mounted over platform 440B. It is noted that features in FIG. 4B identified by reference numbers identical to those shown in FIG. 4A correspond respectively to those previously described features, and may share any of the characteristics attributed to those corresponding features, above.

As shown in FIG. 4B, in addition to the features shown in FIG. 4A, platform 440B of figurine 430B further includes motor controller circuitry 456 having motor control unit (MCU) 458. Moreover, according to the implementation shown in FIG. 4B, body 450B of figurine 430B may include one or more articulable joint(s) 452 configured to enable movement of the head and/or limbs of body 450B under the control of motor 454 and motor controller circuitry 456.

Like figurine 430A, figurine 430B may correspond in general to any or all of figurines 130a-130c/230a-230h in FIGS. 1 and 2. That is to say, figurines 130a-130c/230a-230h may share any of the characteristics attributed to figurine 430B by the present disclosure, and vice versa. Thus, although not shown in FIGS. 1 and 2, each of figurines 130a-130c/230a-230h may include features corresponding to body 450B including motor 454 and articulable joint(s) 452, and platform 440B having motor controller circuitry 456 including MCU 458, as well as hardware processor 432, memory 434 storing client application 442, speaker(s) 436, lights 438, and wireless transceiver 448.

Figure 5:
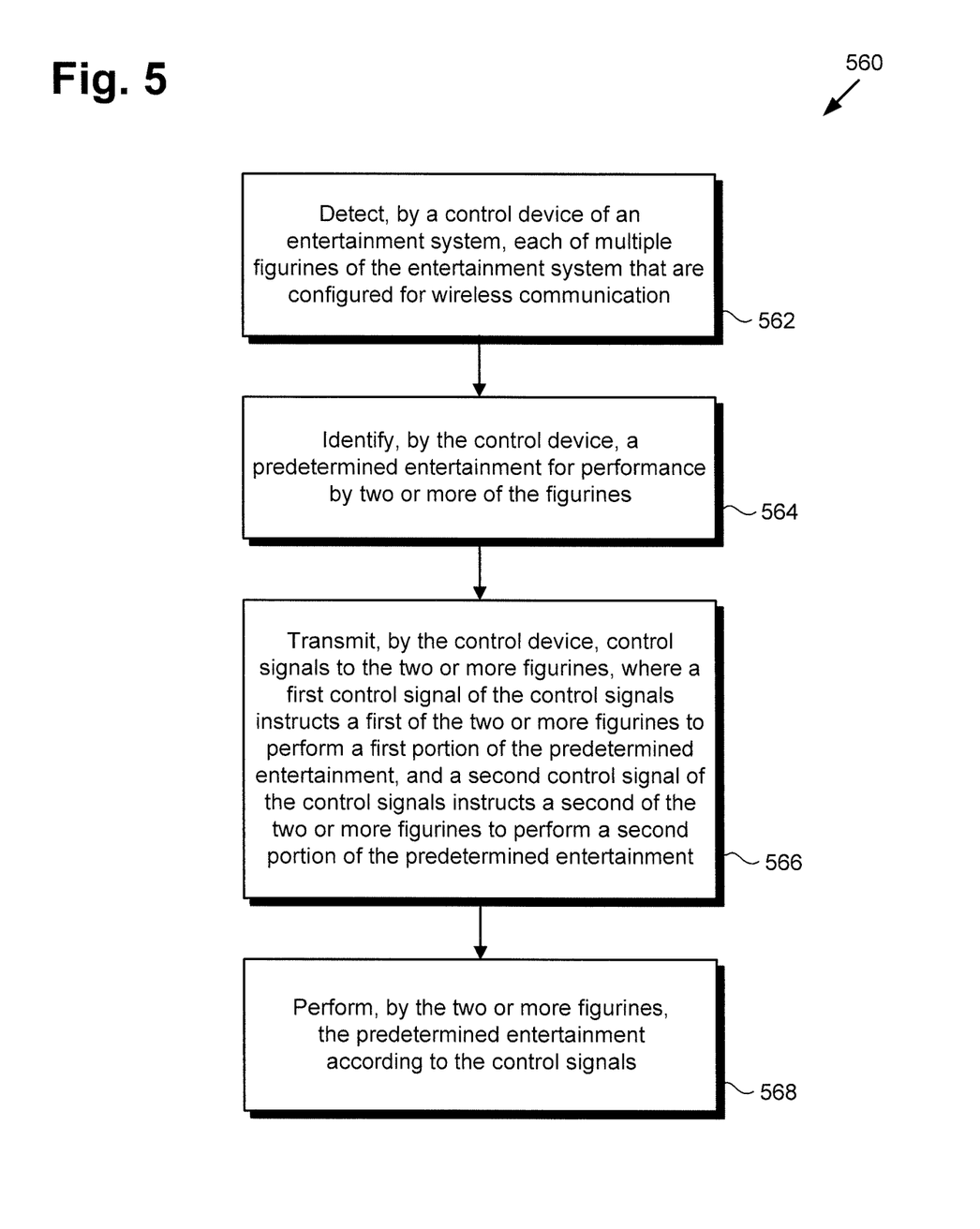
FIG. 5 is a flowchart presenting an exemplary method for use by an entertainment system including performative figurines.

The functionality of entertainment systems 100 and 200 will be further described by reference to FIG. 5 in combination with FIGS. 1, 2, 3, 4A, and 4B. FIG. 5 shows flowchart 560 presenting an exemplary method for use by an entertainment system including performative figurines. With respect to the method outlined in FIG. 5, it is noted that certain details and features have been left out of flowchart 560 in order not to obscure the discussion of the inventive features in the present application.

Flowchart 560 begins with detecting each of figurines 130a-130c/230a-230h/430A/430B (action 562). For example, as shown in FIGS. 1, 2, and 3, control device 110/210/310 may be configured to utilize control application 320 to detect figurines 130a-130c/230a-230h/430A/430B via wireless transceiver 312 and wireless network 102/202. That is to say, each of figurines 130a-130c/230a-230h/430A/430B may broadcast self-identification data enabling control device 110/210/310 to detect figurines 130a-130c/230a-230h/430A/430B. Thus, detection of each of figurines 130a-130c/230a-230h/430A/430B may be performed by control application 320 of control device 110/210/310, executed by hardware processor 314, and using wireless transceiver 312.

Flowchart 560 continues with identifying a predetermined entertainment for performance by two or more of figurines 130a-130c/230a-230h/430A/430B (action 564). The predetermined entertainment for performance by two or more of figurines 130a-130c/230a-230h/430A/430B may be identified by control application 320 of control device 110/210/310, executed by hardware processor 314.

In one implementation, the predetermined entertainment for performance by two or more of figurines 130a-130c/230a-230h/430A/430B may be identified through use of one or more of figurines database 322 and performances library 324. In one implementation, figurines database 322 may include database entries corresponding respectively to each of figurines 130a-130c/230a-230h/430A/430B and identifying the movie, television, or theme park character depicted by the figurine, a performance group or groups to which the figurine may belong, and an entertainment performance or performances of which the figurine is capable.

For example, figurine database 322 may associate a particular musical soundtrack or song with each of figurines 130a-130c/230a-230h/430A/430B. As another example, where one or more of figurines 130a-130c/230a-230h/430A/430B includes articulable joint(s) 452, figurine database 322 may describe the head or limb movement(s) of which that/those figurines are capable of executing.

Performances library 324 may include predetermined entertainment performances that blend the individual performance capabilities of two or more of figurines 130a-130c/230a-230h/430A/430B or two or more groups of figurines 130a-130c/230a-230h/430A/430B. For example, where action 562 results in detection of three figurines 130a, 130b, and 130c, action 564 may result from searching performances library 324 for predetermined entertainment performances that include any two, or all three of, figurines 130a, 130b, and 130c, but that do not require the participation of other figurines.

Thus, the predetermined entertainment identified in action 564 may be identified based on the figurines detected by control device 110/210/310 in action 532. For merely exemplary purposes, and in the interests of conceptual clarity, flowchart 560 will be further described by reference to a use case in which figurines 130a, 130b, and 130c are detected in action 562, and in which the predetermined entertainment identified in action 564 is to be performed by figurines 130*a* and 130*b*. Flowchart 560 continues with transmitting control signals 104/204 to figurines 130*a* and 130*b* (action 566). According to one implementation, control signals 104/204 include a first control signal for instructing one of figurines 130*a* or 130*b*, and a second control signal for instructing the other of figurines 130*a* and 130*b*. The first control signal of control signals 104/204 instructs one of figurines 130*a* or 130*b* to perform a first portion of the predetermined entertainment, while the second control signal of control signals 104/204 instructs the other of figurines 130*a* and 130*b* to perform a second portion of the predetermined entertainment. Control signals 104/204 may be transmitted to figurines 130*a* and 130*b* by control application 320, executed by hardware processor 314, and using wireless transceiver 312.

Flowchart 560 can conclude with performing the predetermined entertainment identified in action 564 by figurines 130*a* and 130*b* according to control signals 104/204 (action 568). As noted above, the predetermined entertainment performed by figurines 130*a* and 130*b* may be a light show performed using lights 438 and/or an audio presentation. For example, in some implementations a light show may be synchronized to audio, such as music and/or song for example, output by speaker(s) 318 of control device 110/ 210/310.

In other implementations, a light show performed by figurines 130*a* and 130*b* may be synchronized to audio, such as music and/or song, output by speaker(s) 436 of figurines 130*a* and 130*b*. Furthermore, in implementations in which figurines 130*a* and 130*b* include articulable joint(s) 452, a light show and/or audio presentation performed by figurines 130*a* and 130*b* may be accompanied by movements performed by figurines 130*a* and 130*b* in synchronization with the light show and/or audio. The predetermined entertainment identified in action 564 may be performed by figurines 130*a* and 130*b* under the control of client application 442, executed by hardware processor 432, and using one or more of speaker(s) 436, lights 438, and articulable joints 452.

Thus, the present application discloses various implementations of entertainment systems including performative figurines, as well as methods for their use. From the above description it is manifest that various techniques can be used for implementing the concepts described in the present application without departing to from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An entertainment system comprising:
a control device including a display, a hardware processor, a system memory storing a control application and a figurines database, and a transceiver configured to wirelessly communicate with one or more of a plurality of figurines, the figurines database including an identity of each of the plurality of figurines, wherein each of the plurality of figurines is associated with one or more entertainment performances and with one or more corresponding portions of each of the one or more entertainment performances;
the hardware processor configured to execute the control application to:
detect two or more figurines of the plurality of figurines via the transceiver;
identify, using the figurines database, the identity of each of the detected two or more figurines;
display, using the display, a figurines selection menu including the identified two or more figurines;
receive a user selection selecting one or more figurines of the identified two or more figurines;
identify, using the figurines database and based on the user selection, a first entertainment performance as being associated with each of the selected one or more figurines in the figurines database; and
transmit control signals to the selected one or more figurines via the transceiver, wherein a first control signal of the control signals instructs a first figurine of the selected one or more figurines to perform a first portion of the identified first entertainment performance corresponding to the first figurine;
wherein the first figurine of the selected one or more figurines is configured to perform the first portion of the identified first entertainment performance the first portion of according to the first control signal.

2. The entertainment system of claim 1, wherein each of the selected one or more figurines includes a plurality of lights, and wherein the first entertainment performance comprises a light show performed by the selected one or more figurines.

3. The entertainment system of claim 2, wherein the control device further comprises a speaker, and wherein the light show is synchronized to audio output by the speaker of the control device.

4. The entertainment system of claim 2, wherein each of the selected one or more figurines comprises a speaker, and wherein the light show is synchronized to audio output by respective speakers of the selected one or more figurines.

5. The entertainment system of claim 1, wherein each of the selected one or more figurines portrays one of a movie character, a television character, or a theme park character.

6. The entertainment system of claim 1, wherein the first figurine is configured to receive a second control signal of the control signals, and to retransmit the second control signal to a second figurine of the selected one or more figurines.

7. The entertainment system of claim 1, wherein the control device is configured to transmit the control signals to the first figurine via a first wireless network, and wherein the first figurine is configured to retransmit the control signals to a second figurine of the selected one or more figurines via a second wireless network.

8. The entertainment system of claim 7, wherein the control device is configured to transmit the control signals using a first wireless protocol, and wherein the first figurine is configured to retransmit the control signals using a second wireless protocol different than the first wireless protocol.

9. The entertainment system of claim 1, wherein the control device and the selected one or more figurines are configured to be in wireless communication via a Bluetooth Low Energy (BLE) network.

10. The entertainment system of claim 1, wherein the control device is configured to transmit the control signals to the selected one or more figurines via advertising packets, without having a dedicated wireless network connection to the selected one or more figurines.

11. A method for use by an entertainment system including a control device having a display, a hardware processor, a system memory storing a control application and a figurines database, and a transceiver configured to wirelessly communicate with one or more of a plurality of figurines, the figurines database including an identity of each of the plurality of figurines, wherein each of the plurality of figurines is associated with one or more entertainment performances and with one or more corresponding portions of each of the one or more entertainment performances, the method comprising:

detecting, using the hardware processor and the control application, two or more figurines of the plurality of figurines via the transceiver;

identifying, using the hardware processor and the figurines database, the identity of each of the detected two or more figurines;

displaying, using the hardware processor and the display, a figurines selection menu including the identified two or more figurines;

receiving, using the hardware processor and the control application, a user selection selecting one or more figurines of the identified two or more figurines;

identifying, using the hardware processor and the figurines database and based on the user selection, a first entertainment performance as being associated with each of the selected one or more figurines in the figurines database;

transmitting, using the hardware processor and the control application, control signals to the selected one or more figurines via the transceiver, wherein a first control signal of the control signals instructs a first figurine of the selected one or more figurines to perform a first portion of the identified first entertainment performance corresponding to the first figurine; and     performing, by the first figurine of the selected one or more figurines, the first portion of the first portion of identified first entertainment performance according to the first control signal.

12. The method of claim 11, wherein each of the selected one or more figurines includes a plurality of lights, and wherein the first entertainment performance comprises a light show performed by the selected one or more figurines.

13. The method of claim 12, wherein the control device further comprises a speaker, and wherein the light show is synchronized to audio output by the speaker of the control device.

14. The method of claim 12, wherein each of the selected one or more figurines comprises a speaker, and wherein the light show is synchronized to audio output by respective speakers of the selected one or more figurines.

15. The method of claim 11, wherein each of the selected one or more figurines portrays one of a movie character, a television character, or a theme park character.

16. The method of claim 11, wherein the first figurine is configured to receive a second control signal of the control signals, and to retransmit the second control signal to a second figurine of the selected one or more figurines.

17. The method of claim 11, wherein the control device is configured to transmit the control signals to the first figurine via a first wireless network, and wherein the first figurine is configured to retransmit the control signals to a second figurine of the selected one or more figurines via a second wireless network.

18. The method of claim 17, wherein the control device is configured to transmit the control signals using a first wireless protocol, and wherein the first figurine is configured to retransmit the control signals using a second wireless protocol different than the first wireless protocol.

19. The method of claim 11, wherein the control device and the selected one or more figurines are configured to be in wireless communication via a Bluetooth Low Energy (BLE) network.

20. The method of claim 11, wherein the control device is configured to transmit the control signals to the selected one or more figurines via advertising packets, without having a dedicated wireless network connection to selected one or more figurines.

* * * * *